(12) United States Patent
Namuduri et al.

(10) Patent No.: US 12,113,468 B2
(45) Date of Patent: Oct. 8, 2024

(54) VOLTAGE OVERSHOOT MITIGATION

(71) Applicant: GM GLOBAL TECHNOLOGY OPERATIONS LLC, Detroit, MI (US)

(72) Inventors: Chandra S. Namuduri, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 171 days.

(21) Appl. No.: 17/986,139

(22) Filed: Nov. 14, 2022

(65) Prior Publication Data

US 2024/0162846 A1    May 16, 2024

(51) Int. Cl.
*H02M 7/48* (2007.01)
*H02P 27/06* (2006.01)
*H02P 29/024* (2016.01)

(52) U.S. Cl.
CPC .......... *H02P 29/0241* (2016.02); *H02P 27/06* (2013.01)

(58) Field of Classification Search
CPC ............................. H02P 29/0241; H02P 27/06
See application file for complete search history.

(56) References Cited

U.S. PATENT DOCUMENTS

| 2004/0207359 A1* | 10/2004 | Jahkonen | H02M 1/088 |
| | | | 318/807 |
| 2019/0149063 A1* | 5/2019 | Onda | B60L 3/12 |
| | | | 361/30 |
| 2021/0399542 A1* | 12/2021 | Sorkin | H02P 9/10 |

\* cited by examiner

*Primary Examiner* — Muhammad S Islam
(74) *Attorney, Agent, or Firm* — CANTOR COLBURN LLP

(57) ABSTRACT

A system for controlling an electric motor includes a voltage regulation device connected to the electric motor, the electric motor connected to an inverter by a power cable including at least one electrical conductor. The voltage regulation device includes a diode bridge circuit configured to mitigate overvoltage transients at the electric motor. The diode bridge circuit includes an alternating current (AC) input and a direct current (DC) output, the AC input connected to a terminal of the electric motor.

20 Claims, 6 Drawing Sheets

VOLTAGE OVERSHOOT MITIGATION

INTRODUCTION

The subject disclosure relates to control of electric motors, and more specifically, to modulation of electric motor control signals.

Electric vehicles (EV) and hybrid electric vehicles (HEV) (i.e., electrified vehicles) may include an electric propulsion system including one or more electric drive units having an electric traction motor. Popular motor control methodologies include field oriented control and direct torque control. Electric propulsion systems may include drive units that each include an electric motor and an inverter for converting direct current (DC) power from a battery system to multi-phase alternating current (AC) to drive the electric motor. In some cases, it may be desirable to locate the inverter away from the electric motor (e.g., in the battery system), and connect the inverter to the electric motor by a multi-phase cable.

SUMMARY

In one exemplary embodiment, a system for controlling an electric motor includes a voltage regulation device connected to the electric motor, the electric motor connected to an inverter by a power cable including at least one electrical conductor. The voltage regulation device includes a diode bridge circuit configured to mitigate overvoltage transients at the electric motor. The diode bridge circuit includes an alternating current (AC) input and a direct current (DC) output, the AC input connected to a terminal of the electric motor.

In addition to one or more of the features described herein, the electric motor is a multi-phase motor, the terminal includes a phase terminal for each phase of the electric motor, and the diode bridge circuit includes a diode bridge connected to each phase terminal.

In addition to one or more of the features described herein, the DC output is connected to a propulsion bus of the inverter.

In addition to one or more of the features described herein, the DC output is connected to the propulsion bus by a DC cable having a low inductance.

In addition to one or more of the features described herein, the DC cable has an inductance that is less than about one-tenth an inductance of the power cable.

In addition to one or more of the features described herein, the voltage regulation device includes a resistor and a capacitor connected to the DC output, the resistor and the capacitor forming a resistor-capacitor-diode (RCD) circuit with the diode bridge circuit, the RCD circuit configured to dissipate energy from the overvoltage transients.

In addition to one or more of the features described herein, the voltage regulation device includes a DC-DC converter connected to the DC output and the inverter, the DC-DC converter configured to change an output voltage from the diode bridge circuit to a bus voltage.

In addition to one or more of the features described herein, the inverter is connected to a battery pack in a vehicle, the battery pack configured to provide power to drive the electric motor, and the voltage regulation device includes a DC-DC converter connected to the DC output and a secondary battery that is separate from the battery pack, the DC-DC converter configured to change an output voltage from the diode bridge circuit to a battery voltage of the second battery.

In addition to one or more of the features described herein, the electrical conductor has an inductance of less than about 1 µH.

In another exemplary embodiment, a method of controlling an electric motor includes controlling switching devices of an inverter connected to a battery pack, to convert direct current (DC) from the battery pack to alternating current (AC), transmitting the AC current to an electric motor by a power cable connected to the inverter and the electric motor, the power cable including at least one electrical conductor, and mitigating overvoltage transients by a voltage regulation device connected to the electric motor, the voltage regulation device including a diode bridge circuit, the diode bridge circuit including an AC input and a DC output, the AC output connected to a terminal of the electric motor.

In addition to one or more of the features described herein, the electric motor is a multi-phase motor, the terminal includes a phase terminal for each phase of the electric motor, and the diode bridge circuit includes a diode bridge connected to each phase terminal.

In addition to one or more of the features described herein, the DC output is connected to a propulsion bus of the inverter by a DC cable having a low inductance.

In addition to one or more of the features described herein, the DC cable has an inductance that is less than about one-tenth an inductance of the power cable.

In addition to one or more of the features described herein, the voltage regulation device includes a resistor and a capacitor connected to the DC output, the resistor and the capacitor forming a resistor-capacitor-diode (RCD) circuit with the diode bridge circuit, the method further comprising dissipating energy from the overvoltage transients by the RCD circuit.

In addition to one or more of the features described herein, the voltage regulation device includes a DC-DC converter connected to the DC output and the inverter, the method further comprising changing an output voltage from the diode bridge circuit to a bus voltage by the DC-DC converter.

In addition to one or more of the features described herein, the voltage regulation device includes a DC-DC converter connected to the DC output and a secondary battery that is separate from the battery pack, the method further comprising changing an output voltage from the diode bridge circuit to a battery voltage of the second battery.

In yet another exemplary embodiment, a vehicle system includes a memory having computer readable instructions, and a processing device for executing the computer readable instructions, the computer readable instructions controlling the processing device to perform a method. The method includes controlling switching devices of an inverter connected to a battery pack, to convert direct current (DC) from the battery pack to alternating current (AC), transmitting the AC current to the electric motor by a power cable connected to the inverter and the electric motor, the power cable including at least one electrical conductor, and mitigating overvoltage transients by a voltage regulation device connected to the electric motor, the voltage regulation device including a diode bridge circuit, the diode bridge circuit including an AC input and a DC output, the AC input connected to a terminal of the electric motor.

In addition to one or more of the features described herein, the DC output is connected to a propulsion bus of the inverter by a DC cable having a low inductance.

In addition to one or more of the features described herein, the voltage regulation device includes a resistor and a capacitor connected to the DC output, the resistor and the capacitor forming a resistor-capacitor-diode (RCD) circuit with the diode bridge circuit, the method further comprising dissipating energy from the overvoltage transients by the RCD circuit.

In addition to one or more of the features described herein, the voltage regulation device includes a DC-DC converter connected to the DC output and the inverter, the method further comprising changing an output voltage from the diode bridge circuit to a bus voltage by the DC-DC converter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
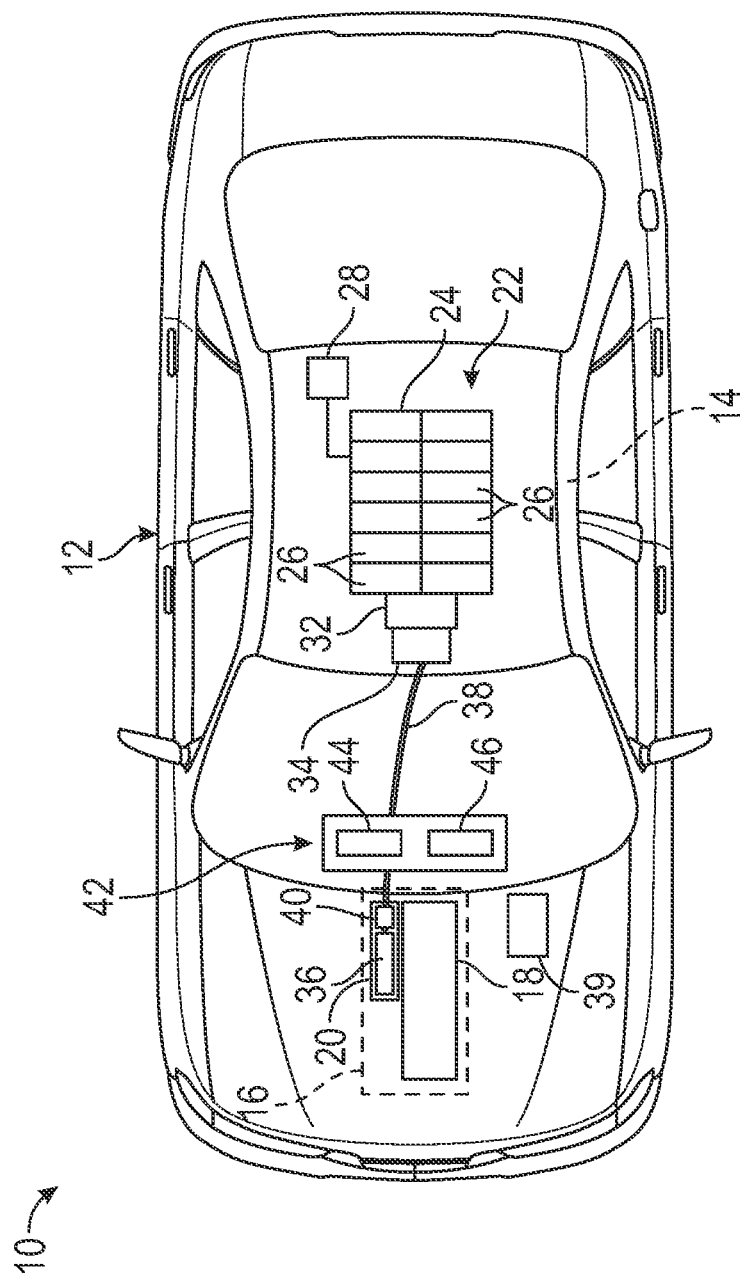
FIG. 1 is a top view of a motor vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for electric motor control. An embodiment of a propulsion system includes an inverter configured to receive direct current (DC) power from a battery assembly (e.g., battery pack) and convert the DC power to alternating current (AC) signals for driving an electric motor. The inverter is electrically connected to the electric motor by an electrical conductor (e.g., a high voltage coaxial cable or other AC power cable). The propulsion system includes a voltage regulation device that includes a diode bridge rectifier connected to the electric motor. The diode bridge rectifier regulates the voltage applied to the motor to reduce or eliminate voltage spikes resulting from, for example, capacitance of the AC cable. The diode bridge rectifier may include a diode bridge connected to each phase of the motor (e.g., connected to an appropriate motor terminal).

In an embodiment, the voltage regulation device includes a low inductance and/or low current conductor (e.g., a twisted pair or coaxial DC cable) that returns resonant energy from the voltage regulation device to the battery pack. In an embodiment, the rectifier includes a filter device such as a resistor-capacitor-diode (RCD) filter that absorbs the resonant energy. A DC-DC converter may be included to facilitate energy return to the battery pack or a secondary battery.

Embodiments described herein present numerous advantages and technical effects. The embodiments provide for flexibility in designing drive systems by allowing inverters to be separated from drive units and positioned at various locations (e.g., at or near a battery pack). Typical inverters used in electric and hybrid vehicles are wide band gap (WBG) inverters that feature high switching speeds. When an inverter is located outside a drive unit and connected to the motor through an AC cable, the secondary effects may be exacerbated by mismatches between cable and motor impedance that can cause unwanted overvoltage transients (e.g., voltage spikes). Embodiments address the above limitations and provide a solution that allows the use of AC cables of various lengths while reducing or eliminating effects due to such cables. In addition, the voltage regulation devices described herein can be easily integrated into a motor housing or other existing component or module without the need for active control or sensing.

The embodiments are not limited to use with any specific vehicle and may be applicable to various contexts. For example, embodiments may be used with automobiles, trucks, aircraft, construction equipment, farm equipment, automated factory equipment and/or any other device or system for which additional thermal control may be desired to facilitate a device or system's existing thermal control capabilities or features.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 may be an electrically powered vehicle (EV) or a hybrid vehicle. In an embodiment, the vehicle 10 is a hybrid vehicle that includes a combustion engine system 18 and at least one drive unit 20. The drive unit 20 includes an electric motor 36, and may include other components, such as a gear box and cooling components. The propulsion system 16 may include any number of electric motors and/or drive units positioned at various locations.

The vehicle 10 includes a battery system 22, which may be electrically connected to the drive unit 20 and/or other components, such as vehicle electronics. The battery system 22 may be configured as a rechargeable energy storage system (RESS). In an embodiment, the battery system 22 includes a battery assembly such as a high voltage battery pack 24 having a plurality of battery modules 26. The battery system 22 may also include a monitoring unit 28 that includes components such as a processor, memory, an interface, a bus and/or other suitable components.

The battery system 22 is electrically connected to components of the propulsion system 16. The propulsion system 16 also includes a DC-DC converter 32 and an inverter 34. The inverter 34 (e.g., a traction power inverter unit or TPIM) converts direct current (DC) power from the battery system 22 to multi-phase alternating current (AC) power (e.g., three-phase, six-phase, etc.) to drive the motor 36.

The inverter 34 may be positioned at any suitable location, such as in the drive unit 20, or at a remote location. For example, the inverter 34 is shown as being proximate to the battery pack 24, and connected to the electric motor 36 by an AC cable 38 (e.g., a three-phase AC cable such as a high voltage coaxial cable).

The propulsion system 16 includes or is connected to a control device or processing device for controlling operation thereof. For example, the propulsion system is controlled by a controller 39 that controls the inverter 34 to supply AC power to the motor 36, or provides torque commands to a motor controller (not shown).

The vehicle 10 also includes a computer system 42 that includes one or more processing devices 44 and a user interface 46. The various processing devices and units may communicate with one another via a communication device or system, such as a controller area network (CAN) or transmission control protocol (TCP) bus.

The propulsion system 16 also includes a voltage regulation device 40 that is electrically connected to the motor 36 and the AC cable 38. The voltage regulation device 40 reduces or eliminates overvoltage spikes that can result from use of the cable 38 to transmit AC power.

Figure 2:
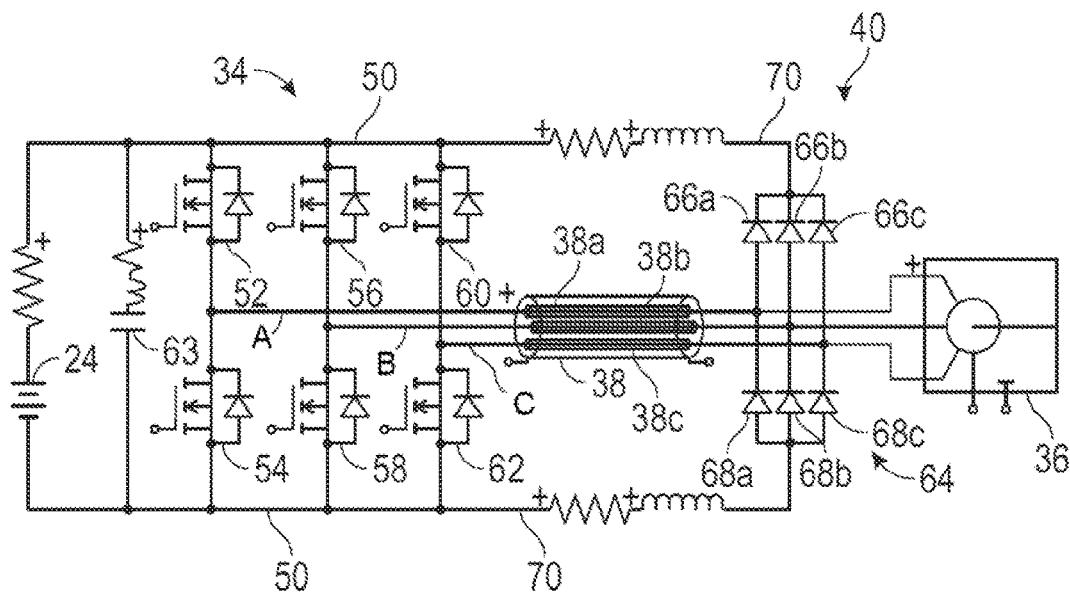
FIG. 2 schematically depicts components of a propulsion system including an inverter connected to an electric motor by a multi-phase cable, and a voltage regulation device including diode bridges connected to phases of the motor and connected to the inverter, in accordance with an exemplary embodiment.

FIG. 2 schematically shows components of the battery system 22 and the propulsion system 16, and an embodiment of the voltage regulation device 40. The motor 36, in an embodiment, is a three-phase AC motor receiving three-phase AC power (although embodiments described herein can be used with motors or machines having any number of phases).

The inverter 34 includes various switching devices connected to a propulsion bus 50. For example, a first switching assembly includes an inverter switch 52 and an inverter switch 54 connected to a first phase (phase A) of the motor 36, a second switching assembly includes an inverter switch 56 and an inverter switch 58 connected to a second phase (phase B), and a third switching assembly includes an inverter switch 60 and an inverter switch 62 connected to a third phase (phase C). Additional components may be included, such as a capacitor 63 for ripple current and voltage stabilization.

In an embodiment, each inverter switch is a semiconductor switch. As non-limiting examples, inverter switches may include metal-oxide-semiconductor (MOS)-controlled Thyristors (MCTs), gallium-nitride (GaN) field-effect transistors (FETs), metal-oxide-semiconductor field-effect transistors (MOSFETs), silicon carbide junction field-effect transistors (SiC JFETs), insulated-gate bipolar transistors (IGBTs) or any other suitable low loss device of suitable voltage and current ratings.

Each switching assembly is a half-bridge connected to a phase of the AC cable 38. For example, the switches 52 and 54 form a half-bridge that is connected to a phase A conductor 38a of the AC cable 38, and the switches 56 and 58 form a half-bridge connected to a phase B conductor 38b. The switches 60 and 62 form a half-bridge connected to a phase C conductor 38c.

The phase A conductor 38a is connected to a phase A winding of the motor, the phase B conductor is connected to a phase B winding and the phase C conductor 38c is connected to a phase C winding.

The voltage regulation device 40 includes a diode bridge rectifier circuit 64. The circuit 64 includes a pair of diodes in a half-bridge configuration connected to each phase of the motor 36 and the AC cable 38. Each half-bridge has an input connected to a motor phase (an AC input), and a DC output for dissipating energy or transmitting energy away from the motor 36.

For example, the diode bridge rectifier circuit 64 (which is also referred to as a diode bridge circuit 64) includes a pair of diodes 66a and 68a, which are connected in parallel to the conductor 38a and/or the phase A terminal. A pair of diodes 66b and 68b are connected in parallel to the conductor 38b and/or the phase B terminal, and a pair of diodes 66c and 68c are connected in parallel to the conductor 38c and/or the phase C terminal.

In an embodiment, the DC output of the diode bridge circuit 64 is connected to the inverter bus 50 by a low inductance cable 70 (shown schematically in FIG. 2). The low inductance cable 70 is configured for transmitting DC power output from the diode bridge circuit 64. The low inductance cable 70 can be used to return or route DC energy from voltage spikes to the inverter 34 and the battery pack 24. Routing energy back to the inverter 34 and the battery pack 24 increases the effectiveness of the diode bridge circuit 64 in mitigating overvoltages with minimal power loss.

A "low inductance" cable is any conductor or set of conductors that exhibits an inductance below a selected threshold. In an embodiment, each phase of the low inductance cable (e.g., a three-phase coaxial cable) has an inductance of less than about 1 µH, and/or an inductance that is less than about $1/10^{th}$ the inductance of the AC cable 38. For example, a twisted pair or coaxial cable having a small gauge (e.g., an American wire gauge (AWG) of 10 or 12) may be used as the low inductance cable.

Figure 3A:
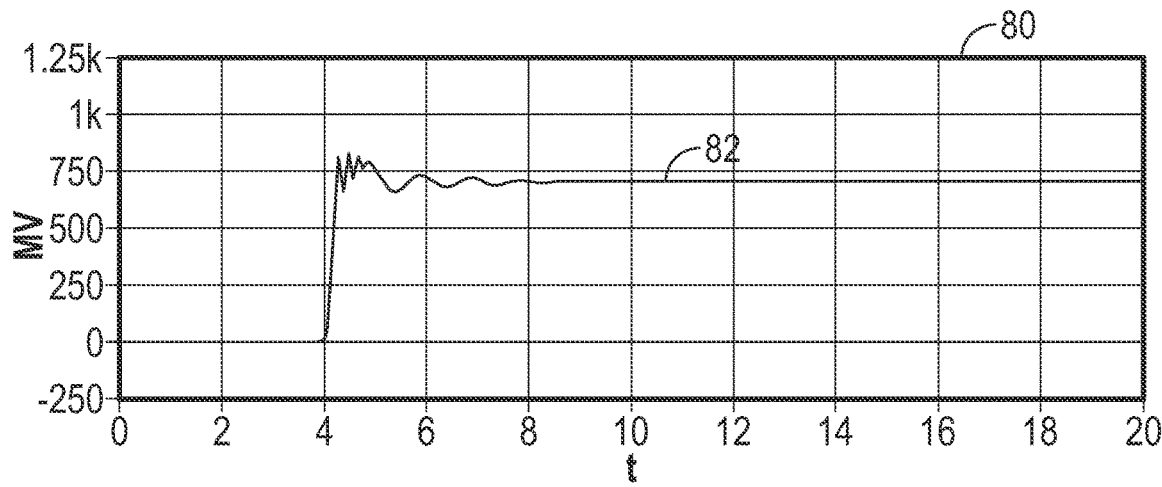
FIGS. 3A and 3B depict examples of voltage applied to the motor and regulated by the voltage regulation device of FIG. 2.

FIG. 3A is a graph 80 that shows voltage characteristics of the motor 36 using an example of the low inductance cable 70. In this example, the cable 70 has an inductance of about 0.1 µH. The voltage characteristics represent motor voltage MV (in Volts) as a function of time (in µs) during a drive cycle in which three-phase power is supplied. Voltage is shown as a curve 82, which demonstrates relatively small over voltages and oscillations in the motor terminal voltage.

Figure 3B:
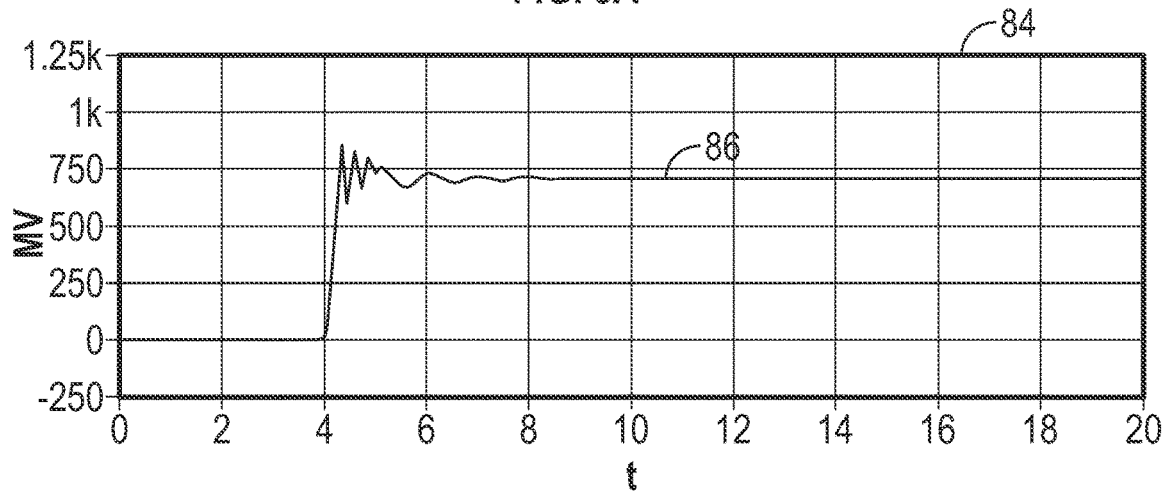

FIG. 3B is a graph 84 showing the motor voltage as a curve 86 when the low inductance cable 70 is a twisted pair cable with strong coupling. As shown, although the cable of FIG. 3B has a higher inductance (about 9.4 µH), this type of cable has been found to also reduce the over voltages at the motor terminals.

Figure 4:
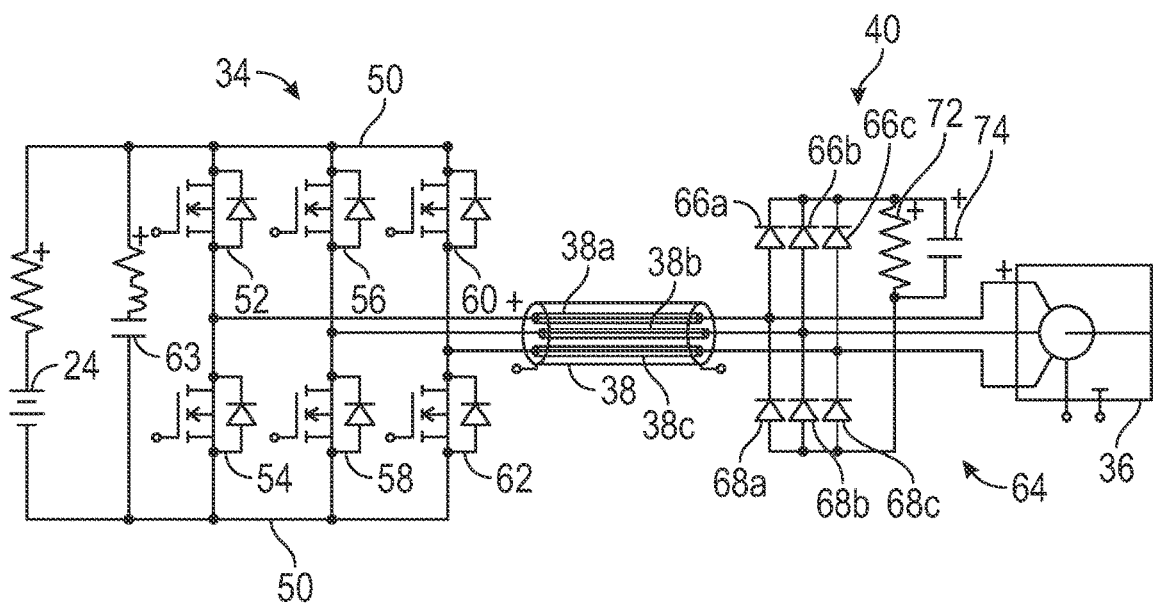
FIG. 4 schematically depicts components of a propulsion system including an inverter connected to an electric motor by a multi-phase cable, and a voltage regulation device including diode bridges and a filter, in accordance with an exemplary embodiment.

FIG. 4 depicts an embodiment of the voltage regulation device 40, in which the device 40 is configured to dissipate energy. The device 40 includes an additional resistor 72 and a capacitor 74 forming an RC dump network. The resulting circuit is a resistor-capacitor-diode (RCD) circuit, in which filtered energy spikes are dissipated through the resistor 72.

Properties of the capacitor 74 and the resistor 72 are selected to limit voltage spikes. For example, the capacitance of the capacitor 74 is selected to be greater than about ten times the capacitance of the low inductance cable 70. An example of a selected resistance of the resistor 72 is about 5 kOhms, and an example of a selected capacitance of the capacitor 74.

Figure 5:
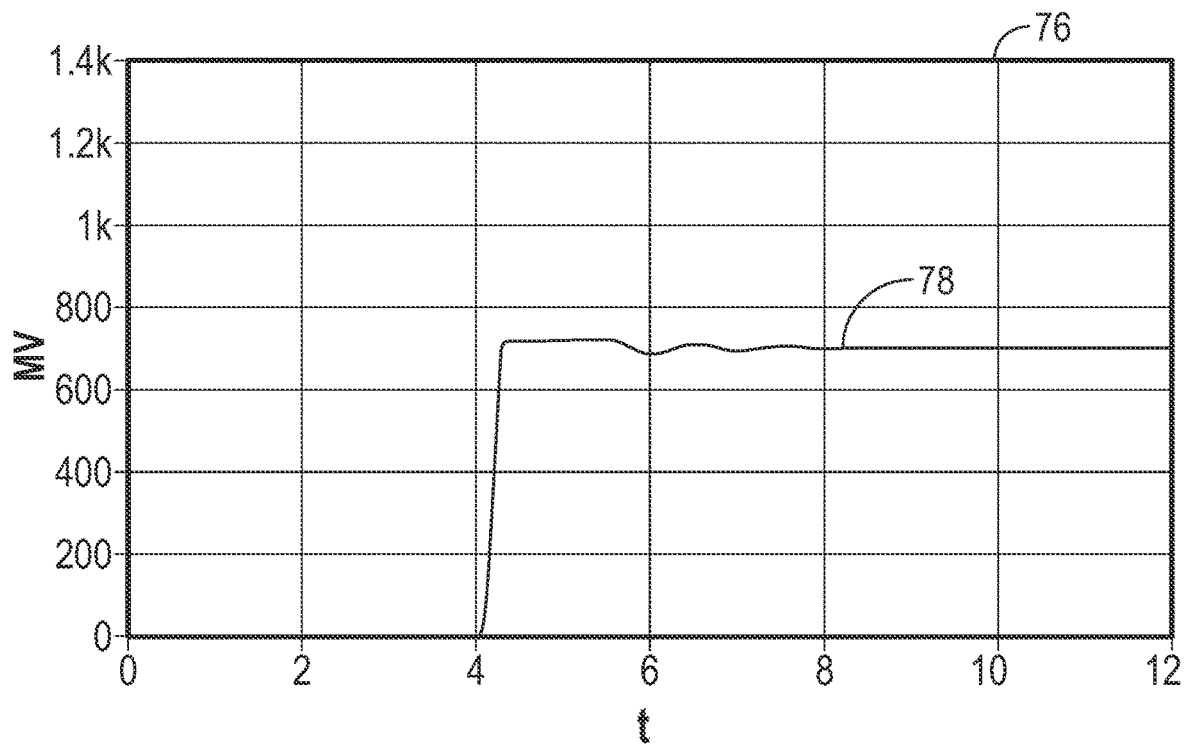
FIG. 5 depicts an example of voltage applied to the motor and regulated by the voltage regulation device of FIG. 4.

FIG. 5 is a graph 76 that shows voltage characteristics of the motor 36 when the voltage is regulated by the device 40 of FIG. 4. The voltage characteristics represent motor voltage MV as a function of time during a drive cycle in which three-phase power is supplied. Voltage is shown as a curve 78, which shows how overvoltage spikes have been reduced.

Figure 6:
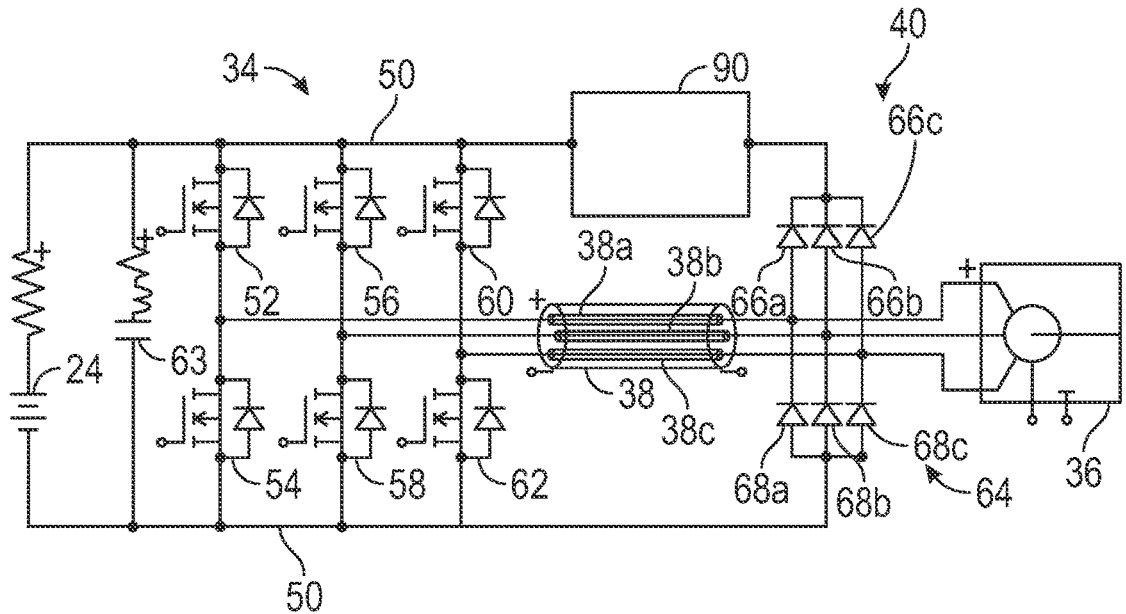
FIG. 6 schematically depicts components of a propulsion system including an inverter connected to an electric motor by a multi-phase cable, and a voltage regulation device including diode bridges connected to phases of the motor and connected to a DC-DC converter, in accordance with an exemplary embodiment.

FIG. 6 depicts an embodiment of the voltage regulation device 40, in which the DC output of the diode bridge circuit 64 is returned to the battery pack 24 and the inverter 34. In this embodiment, the diode bridges are connected back to the inverter 34 by any suitable conductor or cable (e.g., a cable having a higher inductance than the cable 70) and a DC-DC converter 90. The DC-DC converter 90 can increase (boost) or decrease (buck) the output voltage from the diode bridge circuit 64 to conform the voltage to a bus voltage (e.g., 400 V or 800 V). In this way, energy can be returned to the propulsion system 16 to increase the efficiency thereof.

Figure 7:
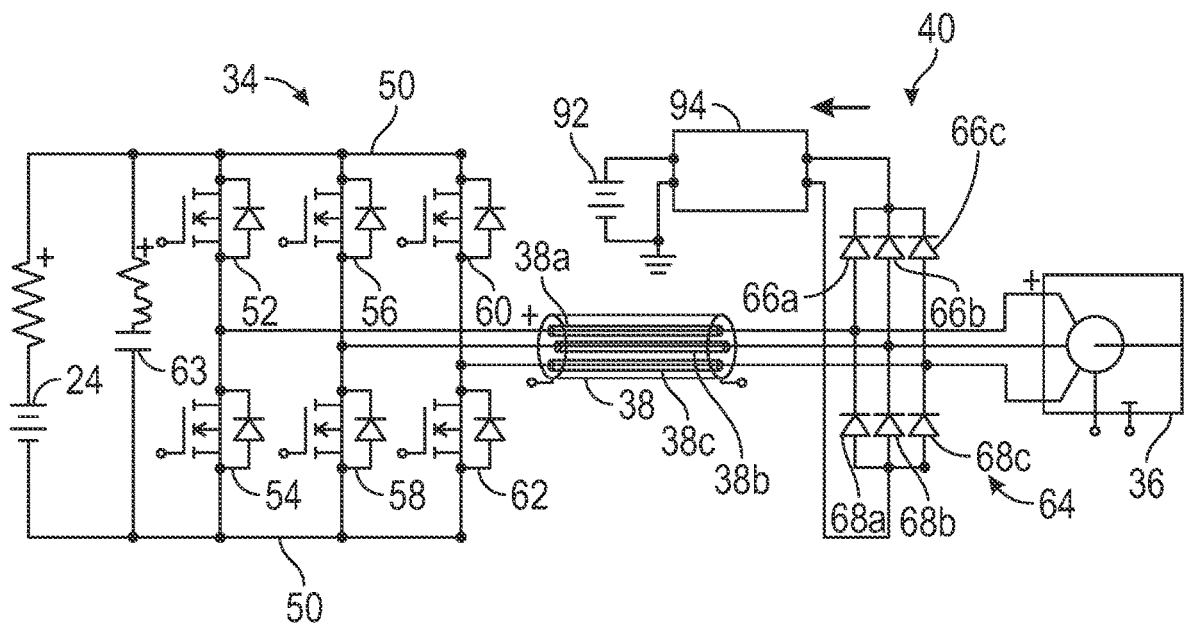
FIG. 7 schematically depicts components of a propulsion system including an inverter connected to an electric motor by a multi-phase cable, and a voltage regulation device including diode bridges connected phases of the motor and to a DC-DC converter connected to a secondary battery, in accordance with an exemplary embodiment.

FIG. 7 depicts an embodiment of the voltage regulation device 40, in which the diode bridge circuit 64 is connected to a secondary battery 92 (e.g., a 12 V battery). In this embodiment, the device includes a DC-DC converter 94 that changes the output voltage to the secondary battery voltage.

Figure 8:
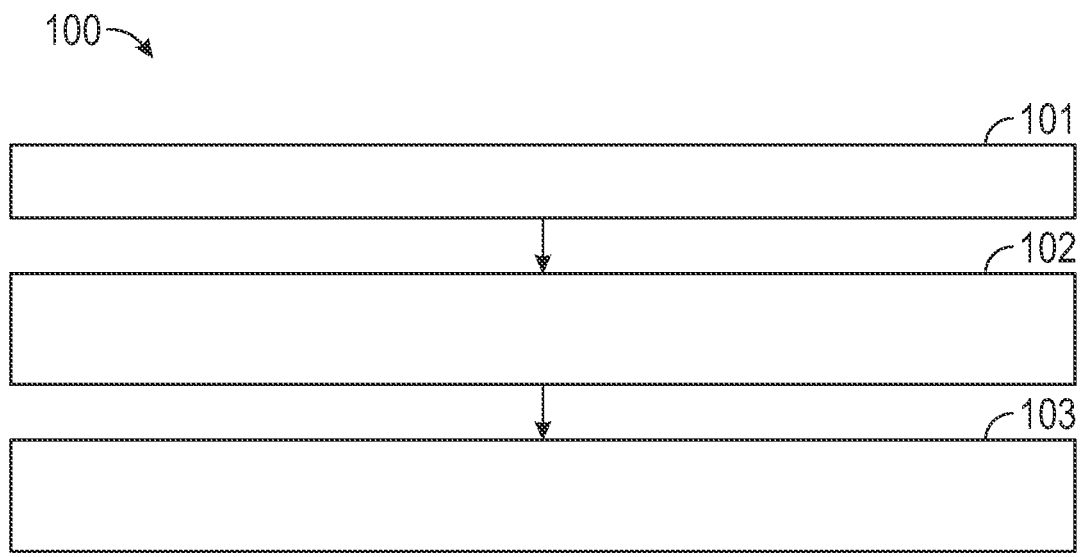
FIG. 8 is a flow diagram depicting aspects of a method of motor control, in accordance with an exemplary embodiment.

FIG. 8 illustrates embodiments of a method 100 of controlling an electric motor. The method 100 may be performed in conjunction with the vehicle 10 and the propulsion system 16. However, the method 100 is not so limited and may be used with any suitable electric motor drive system. Aspects of the method 100 may be performed by a suitable processing device or combination of processing devices.

The method 100 includes a number of steps or stages represented by blocks 101-103. The method 100 is not limited to the number or order of steps therein, as some steps represented by blocks 101-103 may be performed in a different order than that described below, or fewer than all of the steps may be performed.

At block 101, a vehicle such as the vehicle 10 is operated, and the motor 36 is engaged to produce torque and drive the vehicle 10. For example, the controller 39 operates the various switches in the inverter 34 to provide AC power to each motor phase. The inverter 34 may employ any suitable pulse width modulation (PWM) control, for example sinusoidal pulse width modulation (SPWM) or space vector pulse width modulation (SVPWM), to generate switching signals to convert stored DC power from the battery pack 24 to AC electric power to drive the motor 36 to generate torque.

At block 102, the voltage regulation device 40 operates passively to filter or remove overvoltage spikes as discussed herein. At block 103, energy from the voltage regulation device 40 is either dissipated, or transmitted to the inverter 34 or the secondary battery 94. For example, current from the diode bridge circuit 64 is fed back to the inverter 34, or fed to the secondary battery 92 or other storage device, via the DC-DC converter 94.

Figure 9:
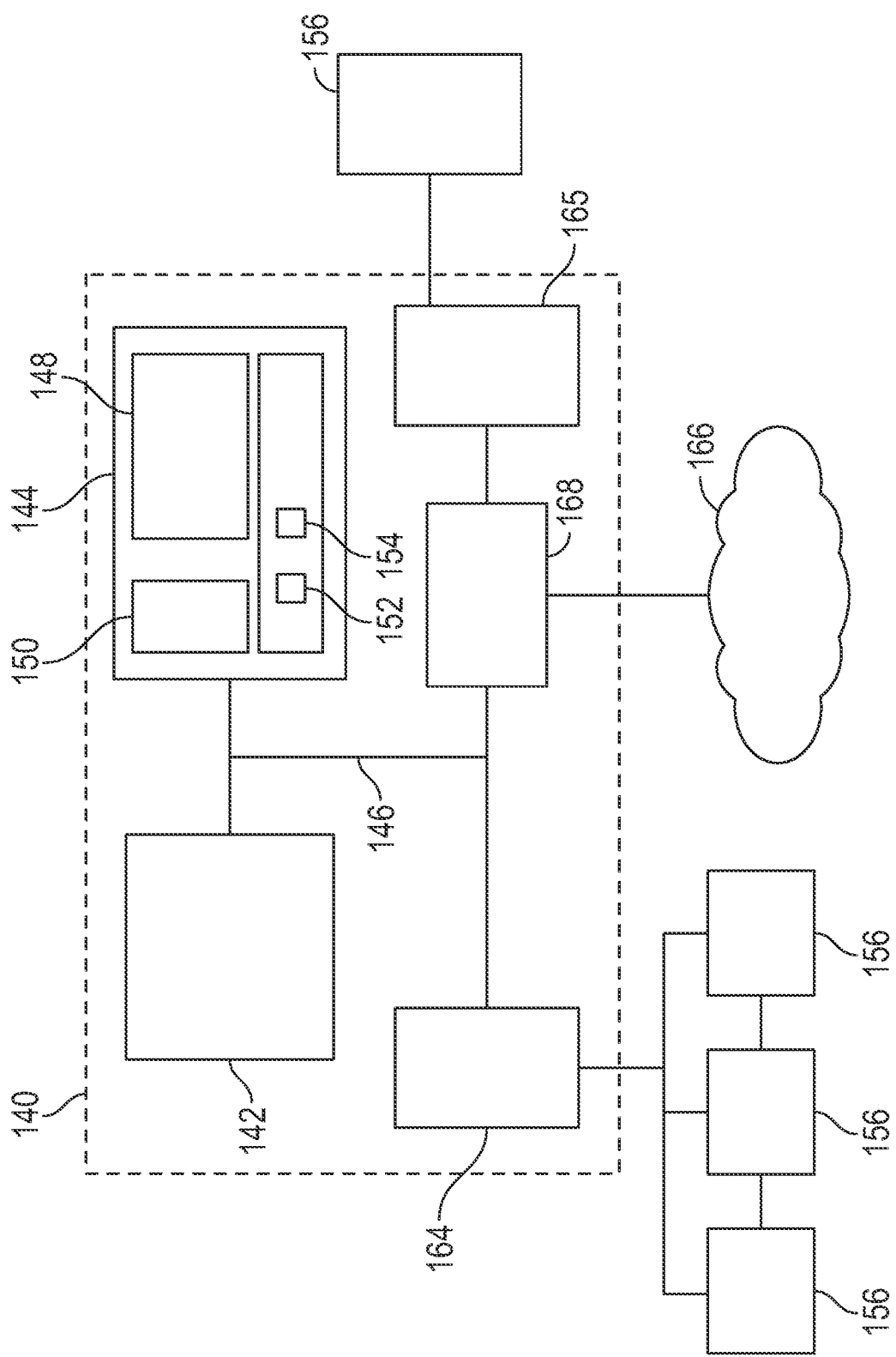
FIG. 9 depicts a computer system in accordance with an exemplary embodiment.

FIG. 9 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a drive system, and a module 154 may be included to perform functions related to controlling an electric motor as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156, such as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for controlling an electric motor, comprising:
a voltage regulation device connected to the electric motor, the electric motor connected to an inverter by a power cable including at least one electrical conductor, the voltage regulation device including a diode bridge circuit configured to mitigate overvoltage transients at the electric motor, the diode bridge circuit including an alternating current (AC) input and a direct current (DC) output, the AC input connected to a terminal of the electric motor.

2. The system of claim 1, wherein the electric motor is a multi-phase motor, the terminal includes a phase terminal for each phase of the electric motor, and the diode bridge circuit includes a diode bridge connected to each phase terminal.

3. The system of claim 1, wherein the DC output is connected to a propulsion bus of the inverter.

4. The system of claim 3, wherein the DC output is connected to the propulsion bus by a DC cable having a low inductance.

5. The system of claim 4, wherein the DC cable has an inductance that is less than about one-tenth an inductance of the power cable.

6. The system of claim 1, wherein the voltage regulation device includes a resistor and a capacitor connected to the DC output, the resistor and the capacitor forming a resistor-capacitor-diode (RCD) circuit with the diode bridge circuit, the RCD circuit configured to dissipate energy from the overvoltage transients.

7. The system of claim 3, wherein the voltage regulation device includes a DC-DC converter connected to the DC output and the inverter, the DC-DC converter configured to change an output voltage from the diode bridge circuit to a bus voltage.

8. The system of claim 1, wherein the inverter is connected to a battery pack in a vehicle, the battery pack configured to provide power to drive the electric motor, and the voltage regulation device includes a DC-DC converter connected to the DC output and a secondary battery that is separate from the battery pack, the DC-DC converter configured to change an output voltage from the diode bridge circuit to a battery voltage of the second battery.

9. The system of claim 1, wherein the electrical conductor has an inductance of less than about 1 µH.

10. A method of controlling an electric motor, the method comprising:
controlling switching devices of an inverter connected to a battery pack, to convert direct current (DC) from the battery pack to alternating current (AC);
transmitting the AC current to the electric motor by a power cable connected to the inverter and the electric motor, the power cable including at least one electrical conductor; and
mitigating overvoltage transients by a voltage regulation device connected to the electric motor, the voltage regulation device including a diode bridge circuit, the diode bridge circuit including an AC input and a DC output, the AC output connected to a terminal of the electric motor.

11. The method of claim 10, wherein the electric motor is a multi-phase motor, the terminal includes a phase terminal for each phase of the electric motor, and the diode bridge circuit includes a diode bridge connected to each phase terminal.

12. The method of claim 10, wherein the DC output is connected to a propulsion bus of the inverter by a DC cable having a low inductance.

13. The method of claim 12, wherein the DC cable has an inductance that is less than about one-tenth an inductance of the power cable.

14. The method of claim 10, wherein the voltage regulation device includes a resistor and a capacitor connected to the DC output, the resistor and the capacitor forming a resistor-capacitor-diode (RCD) circuit with the diode bridge circuit, the method further comprising dissipating energy from the overvoltage transients by the RCD circuit.

15. The method of claim 12, wherein the voltage regulation device includes a DC-DC converter connected to the DC output and the inverter, the method further comprising changing an output voltage from the diode bridge circuit to a bus voltage by the DC-DC converter.

16. The method of claim 10, wherein the voltage regulation device includes a DC-DC converter connected to the DC output and a secondary battery that is separate from the battery pack, the method further comprising changing an output voltage from the diode bridge circuit to a battery voltage of the second battery.

17. A vehicle system comprising:
a memory having computer readable instructions; and
a processing device for executing the computer readable instructions, the computer readable instructions controlling the processing device to perform a method including:
controlling switching devices of an inverter connected to a battery pack, to convert direct current (DC) from the battery pack to alternating current (AC);
transmitting the AC current to an electric motor by a power cable connected to the inverter and the electric motor, the power cable including at least one electrical conductor; and
mitigating overvoltage transients by a voltage regulation device connected to the electric motor, the voltage regulation device including a diode bridge circuit, the diode bridge circuit including an AC input and a DC output, the AC input connected to a terminal of the electric motor.

18. The vehicle system of claim 17, wherein the DC output is connected to a propulsion bus of the inverter by a DC cable having a low inductance.

19. The vehicle system of claim 17, wherein the voltage regulation device includes a resistor and a capacitor connected to the DC output, the resistor and the capacitor forming a resistor-capacitor-diode (RCD) circuit with the diode bridge circuit, the method further comprising dissipating energy from the overvoltage transients by the RCD circuit.

20. The vehicle system of claim 18, wherein the voltage regulation device includes a DC-DC converter connected to the DC output and the inverter, the method further comprising changing an output voltage from the diode bridge circuit to a bus voltage by the DC-DC converter.

\* \* \* \* \*